(12) United States Patent
Ugarte et al.

(10) Patent No.: US 12,281,598 B1
(45) Date of Patent: Apr. 22, 2025

(54) CERAMIC MATRIX COMPOSITE COMPONENT MANUFACTURING

(71) Applicant: General Electric Company, Cincinnati, OH (US)

(72) Inventors: Johnnattan Tennessee Ugarte, Loveland, OH (US); Nolan Leander Cousineau, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/774,993

(22) Filed: Jul. 17, 2024

(51) Int. Cl.
*F01D 9/04* (2006.01)
*B29C 70/02* (2006.01)
*B29C 70/84* (2006.01)
*F01D 5/28* (2006.01)
*F01D 25/00* (2006.01)

(52) U.S. Cl.
CPC .............. *F01D 5/282* (2013.01); *B29C 70/02* (2013.01); *B29C 70/84* (2013.01); *F01D 9/04* (2013.01); *F01D 25/005* (2013.01); *F05D 2240/128* (2013.01); *F05D 2300/6033* (2013.01); *F05D 2300/6034* (2013.01)

(58) Field of Classification Search
CPC .......... F01D 5/282; F01D 9/04; F01D 25/005; B29C 70/02; B29C 70/84; F05D 2300/6033; F05D 2240/128; F05D 2300/6034
See application file for complete search history.

(56) References Cited

U.S. PATENT DOCUMENTS

| | | | |
|---|---|---|---|
| 4,507,011 A | 3/1985 | Brown | |
| 6,648,597 B1 | 11/2003 | Widrig et al. | |
| 8,993,084 B2 | 3/2015 | Griess et al. | |
| 9,068,464 B2 | 6/2015 | Morrison et al. | |
| 9,149,997 B2 * | 10/2015 | Foster | B29C 70/302 |
| 9,157,327 B2 | 10/2015 | Deal et al. | |
| 9,527,170 B2 | 12/2016 | Czerner | |
| 10,267,165 B2 | 4/2019 | Zafiris et al. | |

(Continued)

*Primary Examiner* — Elton K Wong
*Assistant Examiner* — Theodore C Ribadeneyra
(74) *Attorney, Agent, or Firm* — Dority & Manning, P.A.

(57) ABSTRACT

A gas turbine engine is provided. The gas turbine engine includes a stage of airfoil segments having a first ceramic matrix composite (CMC) airfoil segment, the first CMC airfoil segment includes: an end band having a radial surface defining a cold side surface area, $A_{CS}$; and an airfoil coupled to or formed with the end band, the airfoil and the end band defining a joint therebetween, the joint including one or more radial interfaces defining a total radial interface surface area, $A_{RI}$, and one or more axial interfaces defining a total axial interface surface area, $A_{AI}$. The first CMC airfoil segment defines a first ratio of the cold side surface area, $A_{CS}$, to the total axial interface surface area, $A_{AI}$, and a second ratio of the total axial interface surface area, $A_{AI}$ to the total radial interface surface area, $A_{RI}$.

20 Claims, 11 Drawing Sheets

(56) References Cited

U.S. PATENT DOCUMENTS

| | | |
|---|---|---|
| 10,738,628 B2 | 8/2020 | Underwood et al. |
| 11,415,013 B1 * | 8/2022 | Whittle .................. F01D 9/041 |
| 11,466,580 B2 | 10/2022 | Underwood et al. |
| 11,952,917 B2 * | 4/2024 | Wasserman ............. F01D 5/284 |
| 2016/0376893 A1 * | 12/2016 | Hardwicke ........... B29C 65/002 |
| | | 156/249 |
| 2019/0145270 A1 * | 5/2019 | Dunn ..................... F01D 5/282 |
| | | 428/33 |

* cited by examiner

US 12,281,598 B1

CERAMIC MATRIX COMPOSITE COMPONENT MANUFACTURING

FIELD

The present disclosure relates to ceramic matrix composite (CMC) components, such as CMC components for gas turbine engines, and methods of manufacturing and repair thereof.

BACKGROUND

Gas turbine engines feature several components manufactured with CMCs. CMCs provide high temperature capability useful in aerospace applications. Examples of CMC components include turbine blades, nozzles, and shrouds. Within a turbine engine, a nozzle is formed of a plurality of airfoils joined to bands.

Typically, CMC materials include ceramic fibers embedded in a matrix material such as silicon carbide (SiC), silicon, silica, alumina, or combinations thereof. Plies of the CMC material may be laid up to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
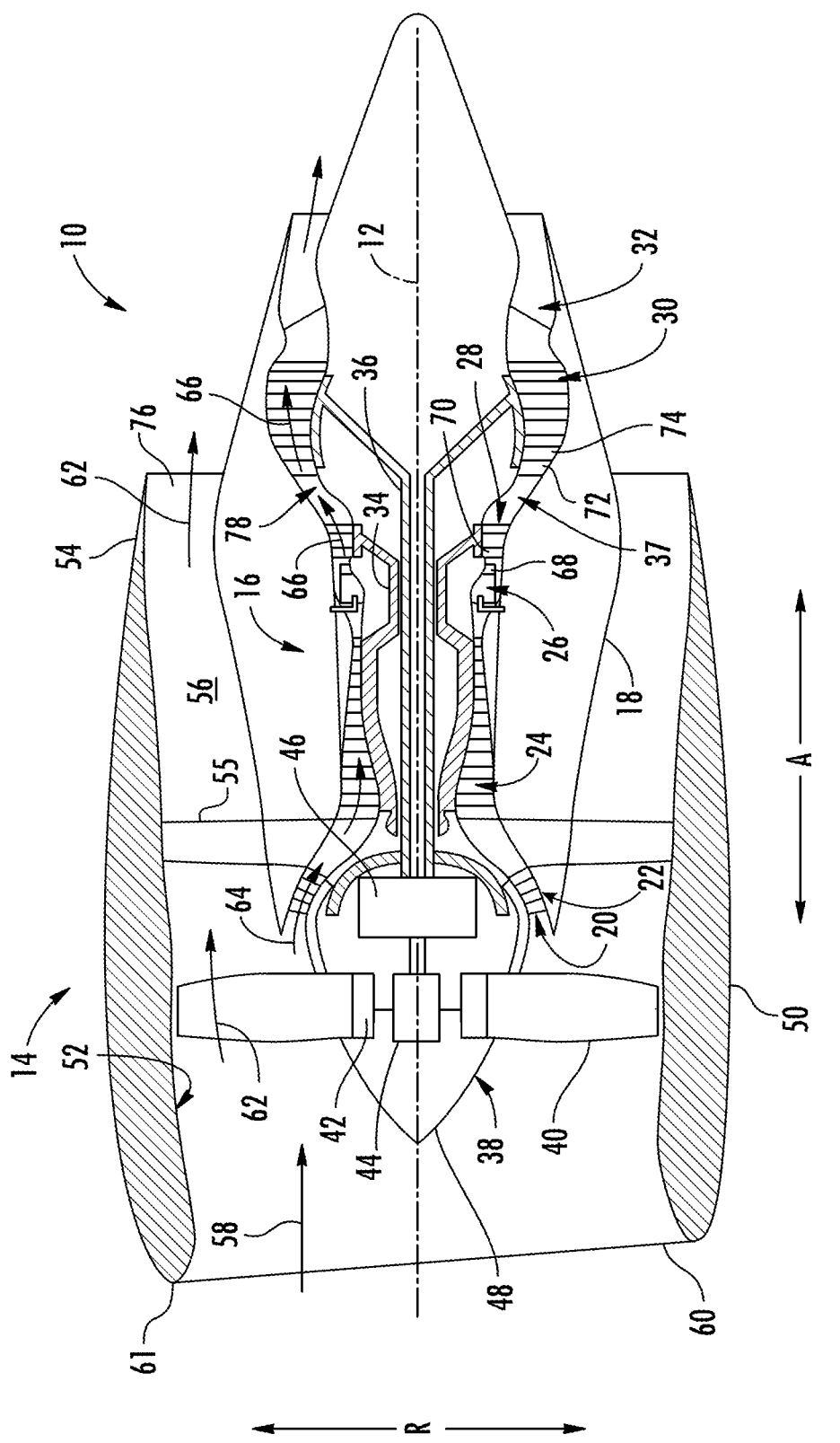
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first," "second," "third," and other ordinals are used to distinguish one component from another and are not intended to signify location or importance of the individual components.

As used herein, ceramic matrix composites or "CMCs" refers to composites comprising a ceramic matrix reinforced by ceramic fibers. Some examples of CMCs acceptable for use herein can include, but are not limited to, materials having a matrix and reinforcing fibers comprising oxides, carbides, nitrides, oxycarbides, oxynitrides and mixtures thereof. Examples of non-oxide materials include, but are not limited to, CMCs with a silicon carbide matrix and silicon carbide fiber (when made by silicon melt infiltration, this matrix will contain residual free silicon); silicon carbide/silicon matrix mixture and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), (silicon dioxide ($SiO_2$), aluminosilicates, and mixtures thereof. Accordingly, as used herein, the term "ceramic matrix composite" includes, but is not limited to, carbon-fiber-reinforced carbon (C/C), carbon-fiber-reinforced silicon carbide (C/SiC), and silicon-carbide-fiber-reinforced silicon carbide (SiC/SiC). In one embodiment, the ceramic matrix composite material has increased elongation, fracture toughness, thermal shock, and anisotropic properties as compared to a (non-reinforced) monolithic ceramic structure.

The terms "low," "high," or their respective comparative degrees (e.g., lower, higher, where applicable) each refers to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Generally, a gas turbine engine includes a fan and a turbomachine, with the turbomachine rotating the fan to generate thrust. The turbomachine includes a compressor section, a combustion section, a turbine section, and an exhaust section and defines a working gas flowpath therethrough. Compressed air from the compressor section is mixed with fuel and combusted within the combustion section to generate combustion gasses. The combustion gasses flow through the turbine section to drive one or more turbines within the turbine section and power the gas turbine engine. The turbomachine includes a stage of stationary airfoils (stator vanes or nozzles) at an inlet to the turbine section to direct the combustion gasses, as well as one or more stages of stationary airfoils throughout the turbine section and compressor section to similarly direct gas flowing therethrough.

With respect to the stage of stationary airfoils at the inlet to the turbine section, and in certain engine configurations, one or more of the stages of stationary airfoils downstream thereof, a temperature of the combustion gasses directed by the airfoils may be relatively high, such that it would be beneficial to form the airfoils of a CMC material. It is desirable to increase the temperature of the combustion gasses to result in net efficiency gains by the gas turbine engine.

The stages of airfoils may each be made up of a plurality of segments having an inner band, an outer band, and an airfoil extending therebetween. When formed of CMC material, each of these parts may be formed separately and bonded together. Moreover, as will be appreciated, a force experienced by the airfoils of a given stage will depend at least in part on a number of airfoils in the stage. It is generally desirably to have fewer airfoils for aerodynamic purposes, but the bond between the airfoil and the inner and outer bands must be capable of accommodating the force expected to be experienced by the airfoils. In particular, given the nature of CMC components, when the inner or outer band is bonded with the airfoil, a shear force experienced by the airfoil segment may be difficult to accommodate.

The inventors of the present disclosure sought out a means to join the components of the airfoil segments in a way to withstand the anticipated forces (e.g., the shear force) without creating weak points through use of separate mechanical structures to bond the components and without forming the bands in an overly bulky manner (which may be cost prohibitive and have a negative effect on aerodynamics) to result in a net gain towards achieving the above goals.

In particular, the inventors recognized that including a stage of airfoil segments formed of a CMC material, referred to herein generally as a CMC nozzle, with an airfoil of an individual segment bonded to an end band of the segment can allow for desired high temperature combustion gasses while still accommodating anticipated shear forces on the CMC nozzle. The inventors recognized, unexpectedly, that such a result could be achieved without the use of a separate mechanical structures and without forming the segments in an overly bulky manner.

In particular, the inventors discovered, unexpectedly, in the course of designing a gas turbine engine having a CMC nozzle, that the costs associated with inclusion of the CMC nozzle with an airfoil of an individual segment bonded to an end band of the segment in the manner described herein can be overcome by the overall engine efficiency benefits associated with, e.g., higher temperature combustion gasses in at least certain designs, contrary to previous thinking and expectations. In particular, the inventors discovered during the course of designing several gas turbine engines having a CMC nozzle of varying thrust classes and shear loading capacities for the CMC nozzle requirements (including the configurations illustrated and described in detail herein), a relationship exists among a cold side surface area of the end band, a total radial interface surface area of a joint between the end band and airfoil, and a total axial interface surface area of the joint between the end band and airfoil, whereby including CMC nozzles with the airfoil segment bonded to the end band in accordance with one or more of the exemplary aspects described herein may result in a net benefit to the overall engine design. As noted, previous thinking was that prohibitively bulky designs or additional mechanical structures, such as bolts between components, were required to join the end band to the airfoil in order to provide the desired shear loading capacity for the CMC nozzle.

With a goal of arriving at an improved gas turbine engine having a CMC nozzle capable of accommodating a desired shear loading capacity, the inventors proceeded in the manner of designing gas turbine engines having CMC nozzles with the airfoil segment bonded to the end band with the end band having various cold side surface areas and a joint between the end band and the airfoil having various total radial interface surface areas and total axial interface surface area; checking an operability and shear loading capacity for the CMC nozzle characteristics of the designed gas turbine engines; redesigning the gas turbine engines to vary the noted parameters based on the impact on other aspects of the gas turbine engines; rechecking the operability and shear loading capacity for the CMC nozzle characteristics of the redesigned gas turbine engines; etc. during the design of several different types of CMC nozzles with the airfoil segment bonded to the end band, including the CMC nozzles with the airfoil segment bonded to the end band described herein, which are described below in greater detail.

Referring now to the drawings, wherein identical numerals indicate the same elements throughout the figures, FIG. 1 is a cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10." The turbofan engine 10 is configured to be mounted to an aircraft, such as in an under-wing configuration or a tail-mounted configuration. As shown in FIG. 1, the turbofan engine 10 defines an axial direction A (extending parallel to a longitudinal centerline provided for reference), a radial direction R, and a circumferential direction (i.e., a direction extending about the axial direction A). The longitudinal centerline defines a longitudinal axis 12 of the turbofan engine 10. In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable rotor blades 40 coupled to a disk 42 in a spaced apart manner. As depicted, the rotor blades 40 extend outwardly from disk 42 generally along the radial direction R. The rotor blades 40, disk 42, and actuation member 44 are together rotatable about the longitudinal centerline 12 by the LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

Referring still to the exemplary embodiment of FIG. 1, the disk 42 is covered by a rotatable front nacelle or hub 48 aerodynamically contoured to promote an airflow through the plurality of rotor blades 40. Additionally, the exemplary fan section 14 includes an annular fan casing or outer nacelle 50 that at least partially (and for the embodiment depicted, circumferentially) surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50 and/or the fan section 14. As the volume of air 58 passes cross the rotor blades 40, a first portion of the air 58 as indicated by arrow 62 is directed or routed into the bypass airflow passage 56, and a second portion of the air 58 as indicated by arrow 64 is directed or routed into the core air flowpath 37. The pressure of the second portion of air indicated by the arrow 64 is then increased as it is routed through the HP compressor 24 and into the combustion section 26, where it is mixed with fuel and burned to provide combustion gases 66. The combustion gases 66 are routed from the combustion section 26 through the HP turbine 28. In the HP turbine 28, a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and/or kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least 20,000 pounds of thrust, such as at least about 25,000, 30,000, and up to, e.g., 150,000 pounds of thrust. Accordingly, the turbofan engine 10 may be referred to as a relatively large power class gas turbine engine.

Moreover, the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., the power gearbox 46) driving the fan, may include any other suitable number or arrangement of shafts, spools, compressors, turbines, etc. Further, although a turbofan engine is depicted in FIG. 1, in other exemplary embodiments, aspects of the present disclosure may be incorporated into any other suitable gas turbine engine, such as a turboprop engine, turboshaft engine, etc.

Figure 2:
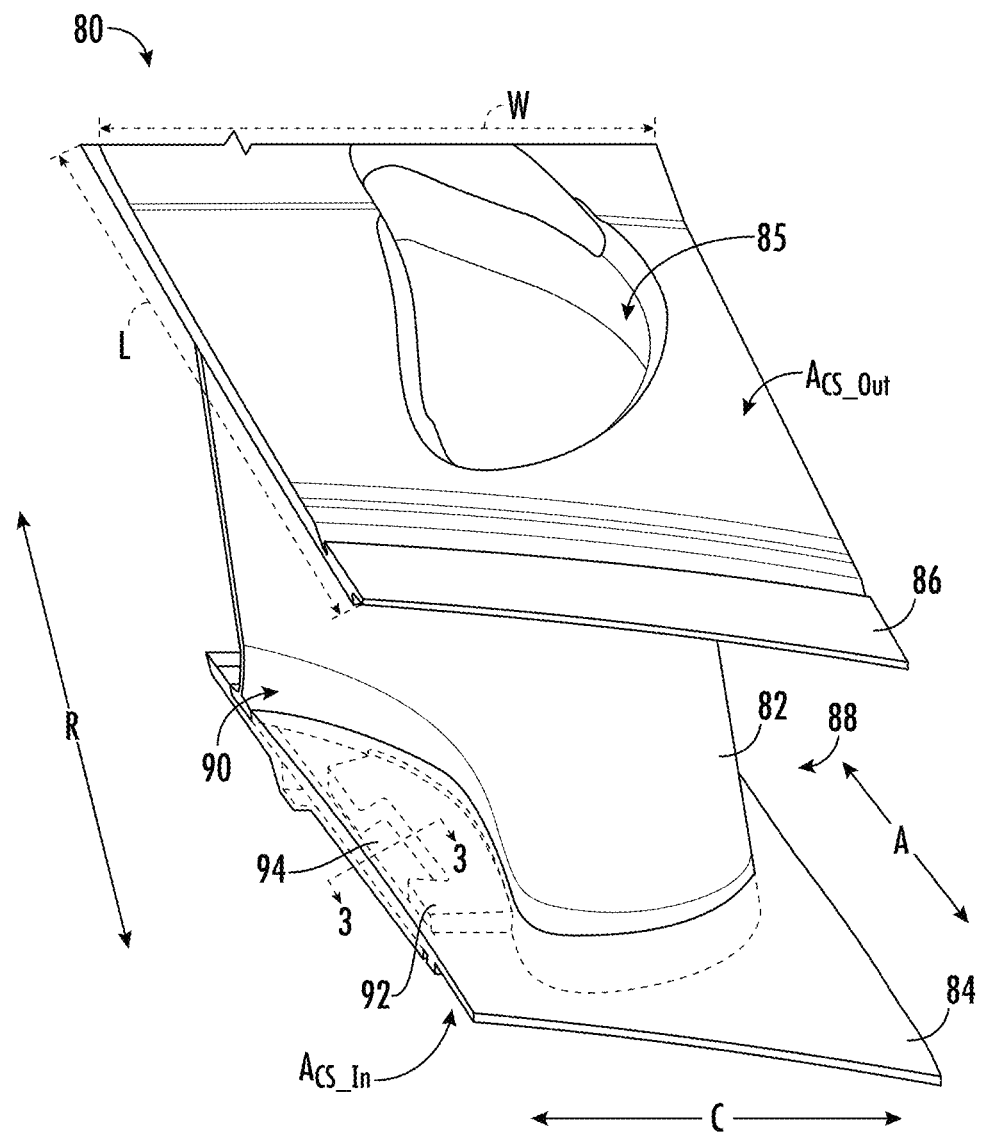
FIG. 2 is a perspective view of a nozzle airfoil segment of the gas turbine engine of FIG. 1.

With reference to FIG. 2, a perspective view of a CMC component is shown. The CMC component more specifically is a nozzle 80, and more specifically still is an airfoil segment of the nozzle 80. The nozzle 80 may be located adjacent to a stage of rotating rotor blades of a turbomachine, such as immediately upstream of a first stage of rotor blades of an HP turbine (see HP turbine 28 in FIG. 1). In such a manner, the term "adjacent", with respect to a location of airfoils (or airfoil segments) refers to there being no intervening stage of airfoils (or airfoil segments). Alternatively, in other exemplary embodiments, the CMC component may be one of the rotor blades 40 described above.

The airfoil segment of the nozzle 80 includes an airfoil 82 and an end band. More specifically, the airfoil segment of the nozzle 80 includes a first end band, referred to herein as first band 84, and a second end band, referred to herein as second band 86. The first and second bands 84, 86 secure the airfoil 82 to another structure of the gas turbine engine 10, providing load bearing support to the airfoil 82. The airfoil segment of the nozzle 80 is a monolithic CMC component, i.e., the airfoil 82 and the bands 84, 86 are bonded (e.g., fused) together in a unitary structure with no gaps or seams therebetween.

More specifically, the first band 84 is an inner band (i.e., located at an inner end of the nozzle 80 along a radial direction R) and the second band 86 is an outer band (i.e., located at an outer end of the nozzle along the radial direction R). The outer band defines an outer band cold side surface area, $A_{CS\_Out}$, and the inner band defines an inner band cold side surface area, $A_{CS\_In}$. The outer band cold side surface area, $A_{CS\_Out}$, and the inner band cold side surface area, $A_{CS\_In}$, are more specifically defined by a radial surface of the first band 84 and a radial surface of the second band 86, respectively.

As used herein, the term "cold side surface area" refers to a total footprint surface area of a cold side of the respective inner and outer bands. Accordingly, with reference to the outer band, the outer band cold side surface area, $A_{CS\_Out}$, may be calculated by multiplying a width, W, of the cold side of the outer band (second band 86) by a length, L, of the cold side of the outer band (second band 86), and subtracting a cross-sectional area of an opening 85 to an interior of the airfoil 82. In such a manner, the cold side surface area may be indicative of the amount of force/load bearing support the respective first or second band 84, 86 will need to accommodate.

The airfoil 82 defines a suction side 88 and a pressure side 90. On the pressure side 90 of the airfoil 82, the airfoil 82 includes an extension 92 (depicted in phantom lines) connected to the first band 84 at a mating portion 94 of the first band 84. The extension 92 is positioned on the suction side 88, and further is positioned such that, when mechanical loads are applied to the airfoil 82, the extension 92 bites or grips the mating portion 94 (also depicted in phantom lines), locking the airfoil 82 to the first band 84. The extension 92 thus serves as a locking mechanism for the airfoil 82 that may be used instead of pins or other fasteners to relieve mechanical loads experienced by the airfoil 82. In particular, as will be discussed in more detail below, the inclusion of the extension 92 and mating portion 94 may provide additional axial and radial surface area to improve shear loading capability of the connection between the airfoil 82 and the inner band 84.

Although not depicted, the outer band 86 may have a similar structure at the connection between the outer band 86 and the airfoil 82.

Figure 3:
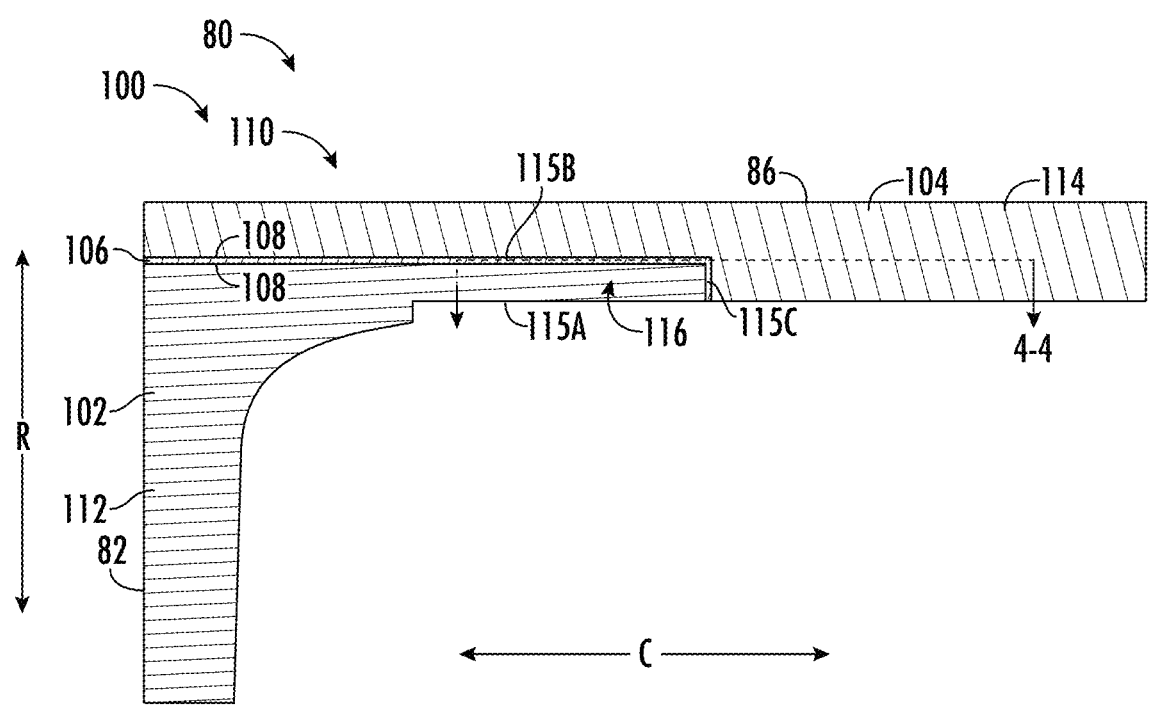
FIG. 3 is a schematic view of an intermediate part of a ceramic matrix composite component.

With reference to FIG. 3, a schematic view is provided of an exemplary CMC component 100 undergoing manufacturing in accordance with an exemplary embodiment of the present disclosure. In particular, for the embodiment depicted, the CMC component 100 is the exemplary nozzle 80 described above with reference to FIG. 2. In particular, the CMC component 100 includes a first part 102 and a second part 104. The first part 102 is at least a portion of the airfoil 82 and the second part 104 is at least a portion of the second band 86 (the outer band). It will be appreciated that the CMC component 100 may be a different component.

During formation, composite plies of a CMC material are laid to form one or more "green state parts," that is, parts formed from composite plies that are in an unheated or "green" state. As shown in FIG. 3, composite plies form the first part 102, and other composite plies separately form the second part 104. The composite plies of the first part 102 may have the same composition (e.g., be formed of the same material) as the composite plies forming the second part 104.

Alternatively, in other exemplary embodiments, the composite plies of the first part 102 may have a different composition (e.g., be formed of different materials) as the composite plies forming the second part 104. For example, in certain exemplary embodiments, the composite plies forming the first part 102 may have a higher temperature capability than the composite plies forming the second part 104.

The first part 102 and the second part 104 are each in the green state. The exemplary embodiment of FIG. 3 shows two parts, and it is appreciated that a different number of parts may be formed by laying up composite plies, e.g., one part, three parts, four parts, or more.

Upon forming the first part 102 and the second part 104, a heating process is applied to densify and shrink the first part 102 and the second part 104. The heating process may be, e.g., a sintering process that improves strength and handling of the first and second parts 102, 104. Alternatively, the heating process may be an autoclaving process, a burnout process, a chemical vapor infiltration process, a pyrolysis process or a melt infiltration process. After the heating process, the first part 102 is a "heated" first part 102, and the second part 104 is a "heated" second part 104.

Following the heating process, the heated first part 102 is bonded to the heated second part 104 with a bonding agent 106 at bonding locations 108 to form an intermediate part 110, referred to as a "preform." The bonding agent 106 may be suitable matrix material, such as a material similar to the constituents of the main composite of the CMC material. The bonding locations 108 may be determined to secure the first part 102 suitably to the second part 104 and may include some or all of the surfaces of the first and second parts 102, 104 that contact each other (or that would contact each other absent a space filled by the bonding agent 106). Note that the bonding agent 106 is depicted with cross-hatching to highlight the bonding agent The intermediate part 110 is thus bonded into a single piece onto which additional composite plies may be laid. The intermediate part 110 of FIG. 3 includes a first portion 112 and a second portion 114. In this exemplary embodiment, the first portion 112 of the intermediate part 110 is the heated first part 102, and the second portion 114 of the intermediate part 110 is the heated second part 104. It will be appreciated that the intermediate part 110 may be formed from more than two parts and may include more than two portions.

The first portion 112 of the intermediate part 110 includes an extension 116. The extension 116 extends from the remainder of the first portion 112 and is arranged to interact with the second portion 114 to assist in formation of the CMC component 100. In particular, the extension 116 extends from a base of the airfoil 82 (i.e., from the first portion 112) and includes a first surface 115A extending perpendicularly from the base, a second surface 115B opposite the first surface 115A also extending perpendicularly from the base, and a third surface 115C extending between the first and second surfaces 115A, 115B.

Figure 4:
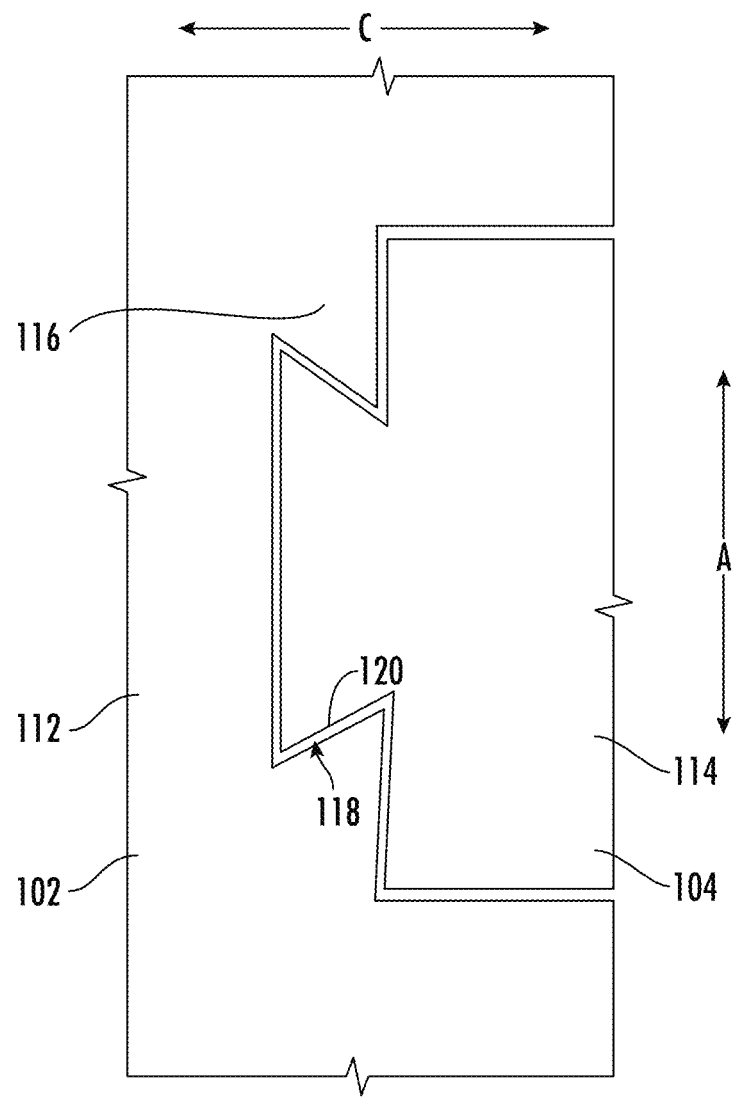
FIG. 4 is a cross-sectional view of the intermediate part of FIG. 3 illustrating an extension with a dovetail.

Referring briefly to FIG. 4, providing a view of the intermediate part along Line 4-4 in FIG. 3, the extension 116 includes a dovetail-shaped slot 118 that is configured to receive a dovetail 120 of the second portion 114. The slot 118 defines an angled surface relative to the remainder of the first portion 112 that mates with the dovetail 120. The slot 118 increases the total contact surface area between the first portion 112 and the second portion 114, as will be described in more detail, below.

It will be appreciated that the connection between the airfoil 82 and the second band 86 (the outer band) may be similar to the connection between the airfoil 82 and the first band 84 (the inner band), which is depicted in phantom in FIG. 2 as including the extension 92 and mating portion 94. In such a manner, the extension 116 and mating portion (dovetail 120) in of the airfoil 82 and second band 86 (outer band) in FIG. 4 may have a similar shape and interaction as the extension 92 and mating portion 94 of the airfoil 82 and first band 84 (inner band) depicted in FIG. 2.

It will be further be appreciated, however, that alternatively the slot 118 may have a different shape, such as a tapered surface, a bulbous profile, a plurality of individual slots, a non-rectangular shape, or the like, and the dovetail 120 of the second portion 114 may instead define any other suitable corresponding shape. In this manner, the slot 118 acts as the mating portion 94 described above, and the dovetail 120 acts as the extension 92, also described above. Because the slot 118 is shaped to mate with the dovetail 120, when loads are applied to the nozzle 80, the outer parts of the extension 116 are pressed onto the dovetail 120, and the contact between the respective angled surfaces of the slot 118 and the dovetail 120 inhibits movement of the first portion 112 relative to the second portion 114.

Figure 5:
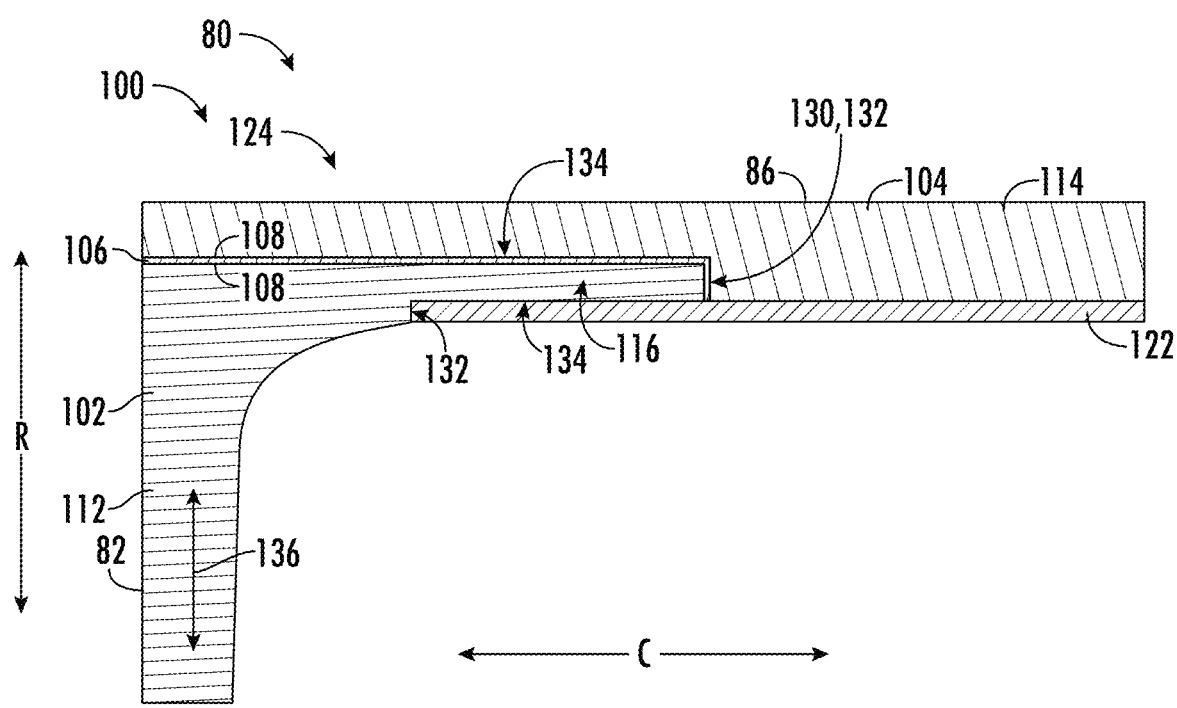
FIG. 5 is a schematic view of the intermediate part of FIG. 3 with composite plies laid thereon.

Referring now to FIG. 5, providing a schematic view of the assembly of FIG. 3 with additional manufacturing steps having been completed, additional composite plies 122 of the CMC material are laid on the extension 116 and the second portion 114 of the intermediate part 110 (FIG. 4) to form a third part 124. The additional composite plies 122 form a green state part (the third part 124) on the intermediate part 110 that provides additional structure to the CMC component 100. The third part 124 includes both the intermediate part 110 (FIG. 4), which was previously heated, and the additional composite plies 122 in the green state.

The third part 124 is then heated in a heating process, as described above, to form the CMC component 100. During the heating process, the third part 124 undergoes densification and strength enhancement, such as the additional composite plies 122 and the intermediate part 110 shrinking to form a friction fit with each other. In particular, because the additional composite plies 122 enclose the extension 116, the second portion 114 of the intermediate part 110 and the additional composite plies 122 both shrink and form an interference fit with the extension 116. Forces applied to the first portion 112 as a result of shrinking cause the extension 116 to contact the additional composite plies 122 and the second portion 114, which lock the extension 116 in place. Upon heating the third part 124, the additional composite plies 122 fuse with the first portion 112 and the second portion 114, forming a monolithic CMC component 100.

In the exemplary embodiment of FIG. 5, all of the additional composite plies 122 are laid and then the third part 124 is heated.

In an alternative embodiment not shown in FIGS. 3-5, some of the additional composite plies are laid and then the third part is heated to form an intermediate CMC component. Then, the rest of the additional composite plies are laid on the intermediate CMC component, and the intermediate CMC component and the rest of the additional composite plies are heated again to form the final CMC component. In such an embodiment, the additional composite plies are densified onto the third part to form the intermediate CMC component, which provide a densified surface onto which the rest of the additional composite plies are laid. Such an embodiment may improve strength of the final CMC component by stratifying densified layers around the dovetail and delaying shrinkage of the additional composite plies into a second heating process. It is appreciated that more than one intermediate CMC component may be formed from more than one application of composite plies in the green state to provide a specified amount of shrinkage and densification for the final CMC component.

Referring still to FIG. 5, with the addition of the additional composite plies 122, a joint 130 is formed between the second band 86 and the airfoil 82 having one or more radial interfaces 132 and one or more axial interfaces 134. As used herein, the term "axial interface" refers to an interface between an end band (e.g., the second band 86 in FIG. 5) and the airfoil 82 that extends in a direction substantially perpendicular to a spanwise direction 136 of the airfoil 82 (e.g., in a direction defining an angle with a reference line perpendicular to the spanwise direction 136 less than or equal to 20 degrees). Further, as used herein, the term "radial interface" refers to an interface between an end band (e.g., the second band 86 in FIG. 5) and the airfoil 82 that extends in a direction substantially parallel to the spanwise direction 136 of the airfoil 82 (e.g., in a direction defining an angle with the reference line perpendicular to the spanwise direction greater than 20 degrees). Additional details on the radial and axial interfaces 132, 134 are described below with reference to FIG. 7.

Referring still to FIG. 5, the additional composite plies 122 are arranged to encapsulate the extension 116, i.e., to cover the extension 116 in a manner where substantially none of a surface of the extension 116 is exposed. Because the additional composite plies 122 extend to both the first part 102 and the second part 104, upon densifying in the heating process, the additional composite plies 122 form a mechanical bond between the first part 102 and the second part 104 that increases an overall strength of the CMC component 100. It will be appreciated that since the additional composite plies 122 are additionally bonded to the first part 102 and the second part 104, an intersection between the additional composite plies 122 and the first part 102 is considered part of the joint 130 formed between the second band 86 and the airfoil 82.

Notably, upon heating the third part 124, the additional composite plies 122 fuse with the intermediate part 110 to form the final CMC component 100. As an example, the third part 124 may undergo a melt infiltration process in which a matrix is melted to infiltrate a porous preform. As another example, the third part 124 may undergo a chemical vapor infiltration process in which a gaseous precursor infiltrates the preform and decomposes to form the ceramic matrix. As yet another example, the third part 124 may undergo an autoclaving process in which heat and pressure are applied to cure the infiltrated preform. As yet another example, the third part 124 may undergo a pyrolysis process in which heat is applied in an inert atmosphere to transform the infiltrated polymer to a ceramic matrix.

Figure 6:
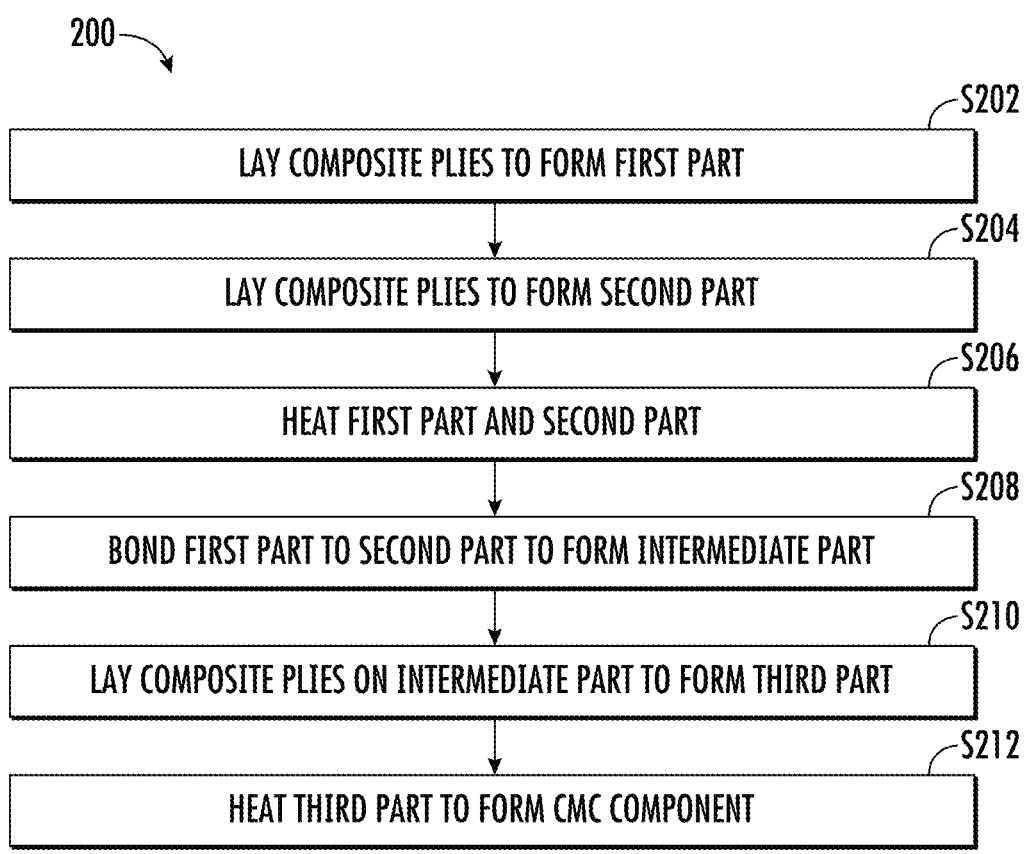
FIG. 6 is a block diagram of an exemplary method for forming a ceramic matrix composite component.

Referring now to FIG. 6, a flow diagram of a method 200 of manufacturing a CMC component in accordance with an exemplary aspect of the present disclosure is provided. The method 200 of FIG. 6 may be utilized to manufacture one or more of the exemplary nozzles described above with reference to FIGS. 1-7. Accordingly, it will be appreciated that the method 200 may generally be utilized to manufacture a nozzle for a gas turbine engine as described above. However, in other exemplary aspects, the method 200 may additionally or alternatively be utilized to manufacture any other suitable CMC component, such as an airfoil.

As is depicted, the method 200 includes at (202) laying first composite plies of a CMC material to form a first part. As described above, the first part includes an extension, which may include a dovetail, a dovetail-shaped slot, or a tab. The first part may be an airfoil of the nozzle.

The method 200 includes at (204) laying second composite plies of the CMC material to form a second part. The second part may be a band of the nozzle. The second part includes a portion that mates with the extension of the first part, such as a dovetail that mates with the dovetail-shaped slot.

The method 200 includes at (206) heating the first part and the second part. As described above, the first part and the second part are each heated in one of an autoclaving process, a burnout process, a chemical vapor infiltration process, a melt infiltration process, or a sintering process. Upon heating, the first part and the second part densify and shrink into a heated first part and a heated second part. The first part and the second part may be heated together in a single heating process, such as being heated in an autoclave together. Alternatively, the first part and the second part may be heated in separate heating processes.

The method 200 includes at (208) bonding the heated first part to the heated second part at bonding locations to form the intermediate part. In particular, as the first and second parts are heated, an extension with a dovetail-shaped slot shrinks around a dovetail, which bites or grips the dovetail, thereby locking the first part and the second part together. As described above, the heated first part may be bonded to the heated second part with a bonding agent. Securing the heated first part to the heated second part with the bonding agent maintains the position of the heated first part relative to the heated second part during the manufacturing process.

The method includes at (210) laying third composite plies onto the intermediate part to form a third part. As described above, a first portion of the intermediate part includes an extension, and the third composite plies are laid on the intermediate part to extend from the extension to a second portion of the intermediate part. By extending the third composite plies from the extension to the second portion, the third composite plies form a green state part that connects the first and second portions.

The method includes at (212) heating the third part to form the CMC component. As described above, the third part is heated in one of an autoclaving process, a burnout process, or a sintering process. During the heating process, the third composite plies densify and shrink around the extension to fuse with the intermediate part, forming a monolithic CMC component.

Figure 7:
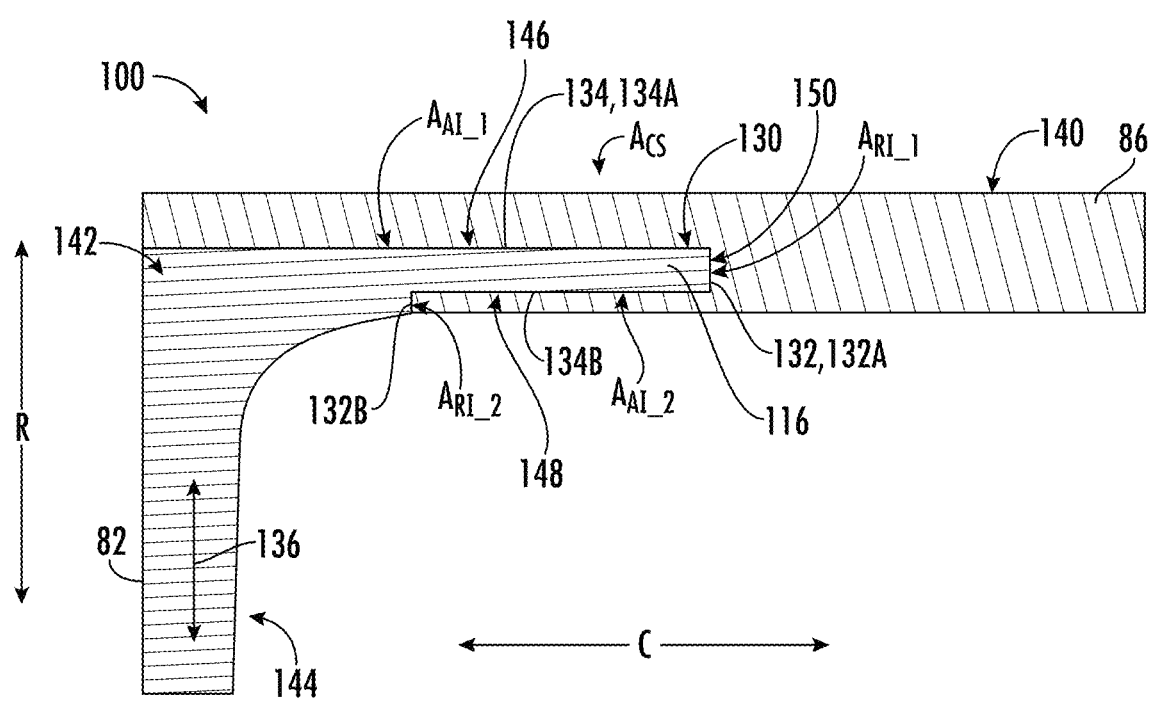
FIG. 7 is a schematic view of a ceramic matrix composite component in accordance with an exemplary embodiment of the present disclosure.

Referring now to FIG. 7, a schematic view is provided of a CMC component 100 following the processing steps discussed above with reference to FIGS. 3 through 5. The CMC component 100 may be the same CMC component 100 discussed above with reference to FIGS. 3 through 5.

In such a manner, it will be appreciated that the CMC component 100 generally includes an end band, and more specifically a second band 86 (outer band), and an airfoil 82. The second band 86 includes a cold side surface 140 defining a cold side surface area, $A_{CS}$. The second band 86 and airfoil 82 together define a joint 130 therebetween. The joint 130 includes one or more axial interfaces 134 and one or more radial interfaces 132. In particular, for the embodiment of FIG. 7, the one or more axial interfaces 134 of the joint 130 includes a first axial interface 134A and a second axial interface 134B, and the one or more radial interfaces 132 includes a first radial interface 132A and a second radial interface 132B.

Further, it will be appreciated that the one or more axial interfaces 134 of the joint 130 (i.e., the first axial interface 134A and the second axial interface 134B for the embodiment shown) collectively define a total axial interface surface area, $A_{AI}$, and similarly, the one or more radial interfaces 132 (i.e., the first radial interface 132A and the second radial interface 132B for the embodiment shown) collectively define a total radial interface surface area, $A_{RI}$. As will be appreciated, e.g., from the perspective view of the embodiment of FIG. 2, both the total axial interface surface area, $A_{AI}$, and the total radial interface surface area, $A_{RI}$, also include a "depth" relative to the view of FIG. 7 in an axial direction A.

For example, in the exemplary aspect shown, a first portion (i.e., a base 142 of the airfoil 82) includes an extension 116. The extension 116 extends from a body 144 of the airfoil 82 and is arranged to interact with a portion of the end band. In particular, the extension 116 includes a first surface 146 extending perpendicularly from the body 144 (and from a spanwise direction 136 of the airfoil 82, defined by the body 144 of the airfoil 82), a second surface 148 opposite the first surface 146 also extending perpendicularly from the body 144, and a third surface 150 extending between the first and second surfaces 146, 148. The first surface 146 and second surface 148 contribute to the total axial interface surface area, $A_{AI}$, and the third surface 150 contributes to the total radial interface surface area, $A_{RI}$. It will be appreciated that the embodiments described herein above are provided by way of example only. In other embodiments any other suitable configurations may be provided.

As alluded to earlier, during the course of designing gas turbine engines having various CMC nozzles with the airfoil segment bonded to the end band—i.e., designing gas turbine engines having CMC nozzles with the airfoil segment bonded to the end band with various cold side surface areas of the end band, total radial interface surface areas of the joint between the end band and airfoil, and total axial interface surface areas of the joint between the end band and airfoil, and evaluating an overall engine performance and shear loading capacity for the CMC nozzle—the inventors unexpectedly discovered a significant relationship between the cold side surface area of the end band, the total radial interface surface area of the joint between the end band and airfoil, and the total axial interface surface area of the joint between the end band and airfoil. The relationship can be thought of as an indicator of the ability of a gas turbine having CMC nozzles with the airfoil segment bonded to the end band to be able to accommodate high combustion gas temperatures and with a desired amount of airfoil segments in the CMC nozzle from an aerodynamic standpoint.

The relationship applies to a gas turbine engine having a CMC nozzle having a plurality of segments, with each segment having an airfoil formed separately from an end band and joined together. The relationship ties the cold side surface area of the end band, the total radial interface surface area of the joint between the end band and airfoil, and the total axial interface surface area of the joint between the end band and airfoil, as described in more detail below.

In particular, the inventors found that a force or loading that an individual segment of a CMC nozzle must withstand is related to a cold side surface area of the end band. For example, with segments that have an end band with a large cold side surface area, there necessarily will be less segments circumferentially and more gas flow over the airfoil of the segment to impart a force on the segment.

Further, with a wide end band, the inventors found that a large total axial interface surface area of the joint is needed to absorb the force and further to accommodate imperfections inherent in bonding two surfaces formed of CMC materials. Moreover, in order to accommodate moment forces and circumferential forces between the end band and airfoil, the joint between the end band and airfoil needs a relatively large total radial interface surface area. In certain embodiments, the total radial interface surface area may be increased by including an extension, such as an extension having a dovetail shape or other non-rectangular shape. Such an arrangement can increase the total radial interface surface area without a corresponding increase to the total axial interface surface area. By including the parameters in the ratios discussed herein, a surface shear force on an edge of one of the components may more effectively be addressed as an interlaminar shear and interlaminar tension within the CMC material of the respective elements of the CMC nozzle.

In particular, the relationship discovered, infra, can therefore identify a gas turbine engine with a CMC nozzle having an airfoil segment bonded to an end band capable of achieving a desired shear loading capacity for the CMC nozzle, while avoiding a prohibitively bulky design and undesirable separate mechanical attachment structures, and suited for a particular mission requirement, one that takes into account efficiency, weight, complexity, reliability, and other factors influencing the optimal choice for a gas turbine engine with a CMC nozzle having an airfoil segment bonded to an end band.

In addition to yielding an improved gas turbine engine with a CMC nozzle, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine (with a CMC nozzle) being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is expressed as a first ratio and a second ratio. The first ratio is of the cold side surface area, $A_{CS}$, to total axial interface surface area, $A_{AI}$, and the second ratio is of the total axial interface surface area, $A_{AI}$ to total radial interface surface area, $A_{RI}$. The benefit of the present disclosure was found when the first ratio is greater than or equal to 2.3 and less than or equal to 10 and when the second ratio is greater than or equal to 1.8 and less than or equal to 10.

In particular, the benefits associated with having a CMC component with the noted ratios of the cold side surface area, $A_{CS}$, total axial interface surface area, $A_{AI}$, and total radial interface surface area, $A_{RI}$, apply to CMC airfoil segments having the values outlined in TABLE 1, below.

TABLE 1

| | Description | Value |
|---|---|---|
| First Ratio | $A_{CS}/A_{AI}$ | Greater than or equal to 2.3 and less than or equal to 10 |
| Second Ratio | $A_{AI}/A_{RI}$ | Greater than or equal to 1.8 and less than or equal to 10 |
| $A_{CS}$ | total cold side surface area of the end band | Greater than or equal to 0.92 square inches (in$^2$) and less than or equal to 144 in$^2$ |
| $A_{AI}$ | total axial interface surface area of the joint | Greater than or equal to 0.4 in$^2$ and less than or equal to 62.6 in$^2$ |
| $A_{RI}$ | total radial interface surface area of the joint | Greater than or equal to 0.22 in$^2$ and less than or equal to 34.7 in$^2$ |

In addition, below are one or more example CMC airfoil segments of the present disclosure, where an end band defines a cold side surface area, $A_{CS}$, and a joint defined between an end band and airfoil of the CMC airfoil segment defines a total axial interface surface area, $A_{AI}$, and a total radial interface surface area, $A_{RI}$, in accordance with one or more exemplary aspects of the present disclosure.

EXAMPLE 1: In this example, the end band is an outer band, the cold side surface area, $A_{CS}$, is 11.5 inches squared (in$^2$), the total axial interface surface area, $A_{AI}$, is 4 in$^2$, and the total radial interface surface area, $A_{RI}$, is 2.2 in$^2$. Accordingly, with such a configuration, the First Ratio ($A_{CS}/A_{AI}$) is 2.88 and the Second Ratio ($A_{AI}/A_{RI}$) is 1.82. With such a configuration, the joint between the outer band and airfoil is sufficient to withstand the anticipated forces on the airfoil segment without requiring a separate mechanical connector or an overly bulky end band. A base of the airfoil includes an extension to increase the total radial interface surface area, $A_{RI}$ (similar to the embodiment of FIGS. 3 through 5).

EXAMPLE 2: In this example, the end band is an outer band, the cold side surface area, $A_{CS}$, is 15 in$^2$, the total axial interface surface area, $A_{AI}$, is 4.15 in$^2$, and the total radial interface surface area, $A_{RI}$, is 1.5 in$^2$. Accordingly, with such a configuration, the First Ratio is 3.61 and the Second Ratio is 2.77. With such a configuration, the joint between the outer band and airfoil is sufficient to withstand the anticipated forces on the airfoil segment without requiring a separate mechanical connector or an overly bulky end band. A base of the airfoil includes an extension to increase the total radial interface surface area, $A_{RI}$ (similar to the embodiment of FIGS. 3 through 5).

EXAMPLE 3: In this example, the end band is an outer band, the cold side surface area, $A_{CS}$, is 140 in$^2$, the total axial interface surface area, $A_{AI}$, is 60 in$^2$, and the total radial interface surface area, $A_{RI}$, is 30 in$^2$. Accordingly, with such a configuration, the First Ratio is 2.33 and the Second Ratio is 2. With such a configuration, the joint between the outer band and airfoil is sufficient to withstand the anticipated forces on the airfoil segment without requiring a separate mechanical connector or an overly bulky end band. A base of the airfoil includes an extension to increase the total radial interface surface area, $A_{RI}$ (similar to the embodiment of FIGS. 3 through 5).

It will be appreciated that the embodiments described herein above are provided by way of example only. In other embodiments any other suitable configurations may be provided.

Figure 8:
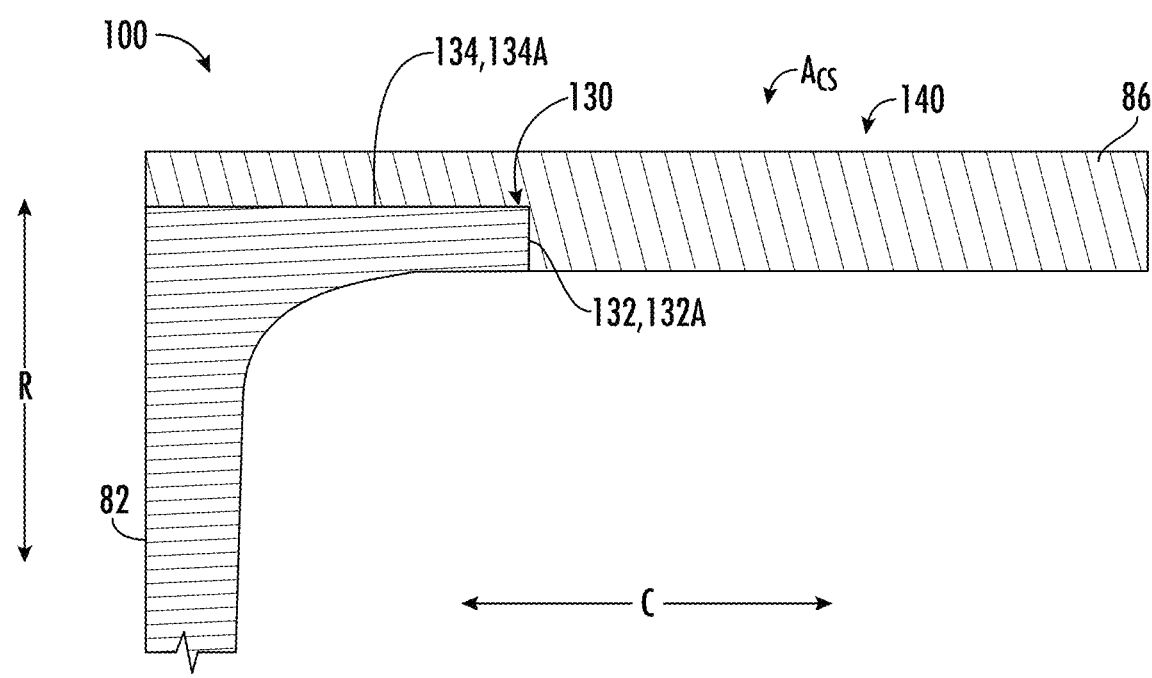
FIG. 8 is a schematic view of a ceramic matrix composite component in accordance with another exemplary embodiment of the present disclosure.
Figure 9:
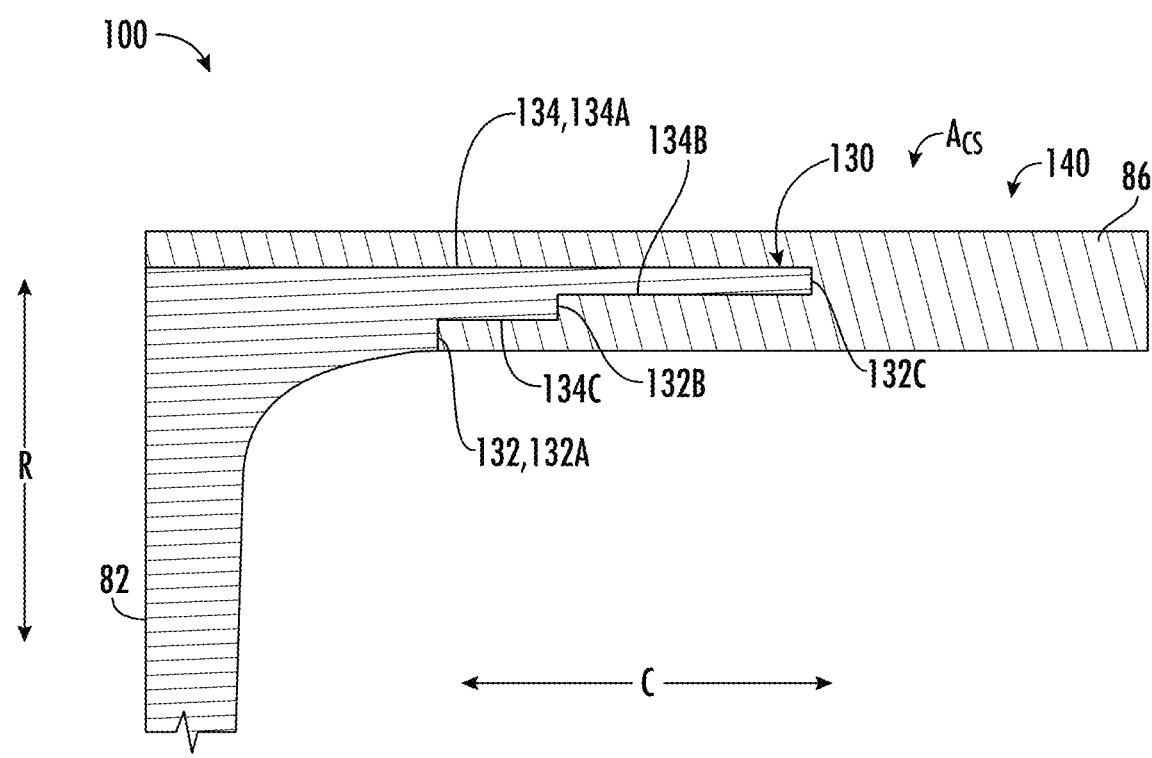
FIG. 9 is a schematic view of a ceramic matrix composite component in accordance with yet another exemplary embodiment of the present disclosure.

For example, with reference to FIGS. 8 and 9, schematic views are provided of two additional CMC components 100 of the present disclosure. The CMC components 100 of FIGS. 8 and 9 may be configured in a similar manner as the exemplary CMC component(s) 100 discussed above with reference to FIGS. 3 through 7.

In such a manner, it will be appreciated that the CMC component 100 in each of FIGS. 8 and 9 generally includes an end band, and more specifically an outer band/second band 86, and an airfoil 82. The second bands 86 each includes a cold side surface 140 defining a cold side surface area, $A_{CS}$. The second band 86 and airfoil 82 of each CMC component 100 together define a respective joint 130 therebetween having one or more axial interfaces 134 and one or more radial interfaces 132.

In particular, for the embodiment of FIG. 8, the one or more axial interfaces 134 of the joint 130 includes a single, first axial interface 134A, and the one or more radial interfaces 132 includes a single, first radial interface 132A.

By contrast, for the embodiment of FIG. 9, the one or more axial interfaces 134 of the joint 130 includes a first axial interface 134A, a second axial interface 134B, and a third axial interface 134C, and the one or more radial interfaces 132 includes a first radial interface 132A, a second radial interface 132B, and a third radial interface 132C.

One or both of the embodiments of FIGS. 8 and 9 may include an extension having a non-rectangular shape (see, e.g., FIG. 4) to increase a total radial interface surface area, $A_{RI}$, or to adjust the First Ratio ($A_{CS}/A_{AI}$), the Second Ratio ($A_{AI}/A_{RI}$), or both. For example, the extension may have a tapered surface, a bulbous profile, a plurality of individual extensions, a non-rectangular shape, or the like, and the second portion may include a slot having a suitable corresponding shape.

It will be appreciated, however, that in other exemplary embodiments the joint 130 may include any other suitable number of axial interfaces 134, radial interfaces 132, or both.

Figure 10:
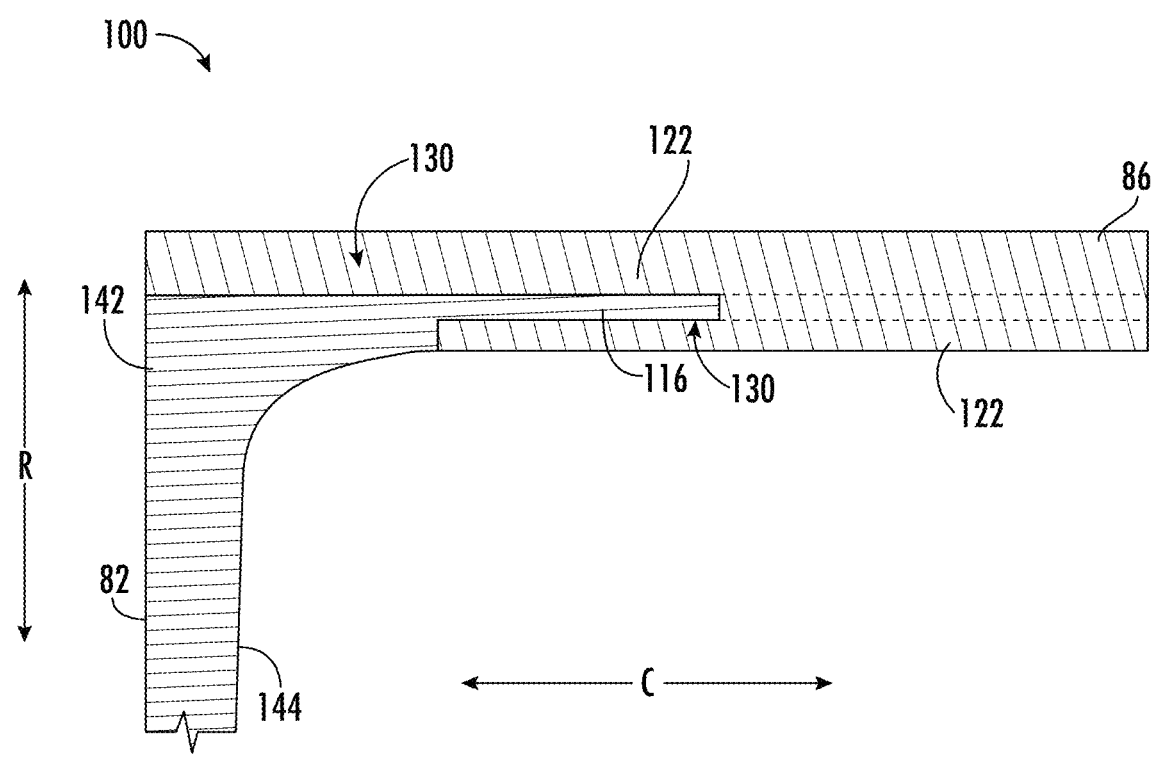
FIG. 10 is a schematic view of a ceramic matrix composite component in accordance with still another exemplary embodiment of the present disclosure.

Moreover, with reference now to FIG. 10, providing a schematic view of a CMC component 100 in accordance with yet another exemplary embodiment of the present disclosure, it will be appreciated that in certain exemplary embodiments, additional plies 122 may additionally or alternatively be applied to the end band (second band 86/outer band in the embodiment shown) and airfoil 82 at a location opposite a body 144 of the airfoil (e.g., on a cold side).

Figure 11:
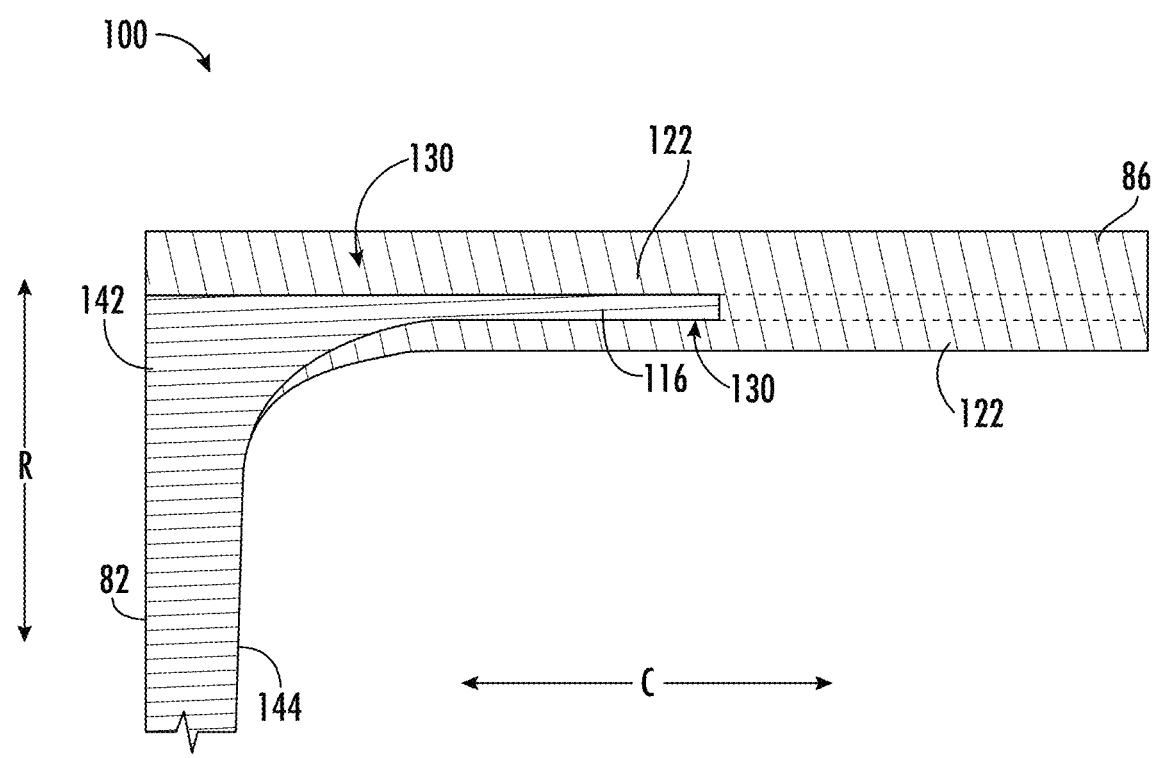
FIG. 11 is a schematic view of a ceramic matrix composite component in accordance with still another exemplary embodiment of the present disclosure.

With reference now to FIG. 11, providing a schematic view of a CMC component 100 in accordance with yet another exemplary embodiment of the present disclosure, it will be appreciated that in certain exemplary embodiments, additional plies 122 may additionally or alternatively be applied to the end band (second band 86/outer band in the embodiment shown) and airfoil 82 that form a tapered surface that extends to a body 144 of the airfoil (e.g., on a cold side). As will be appreciated, a portion of the additional plies 122 may form part of an axial interface and part of a radial interface as those terms are defined hereinabove.

Further aspects are provided by the subject matter of the following clauses:

A ceramic matrix composite (CMC) component comprising: an end band having a radial surface defining a cold side surface area, $A_{CS}$; and an airfoil coupled to or formed with the end band, the airfoil and the end band defining a joint therebetween, the joint comprising one or more radial interfaces defining a total radial interface surface area, $A_{RI}$, and one or more axial interfaces defining a total axial interface surface area, $A_{AI}$, the CMC component defining a first ratio of the cold side surface area, $A_{CS}$, to the total axial interface surface area, $A_{AI}$, greater than or equal to 2.3 and less than or equal to 10 and a second ratio of the total axial interface surface area, $A_{AI}$ to the total radial interface surface area, $A_{RI}$, greater than or equal to 1.8 and less than or equal to 10.

The CMC component of any of the preceding clauses, wherein the end band is an inner band along a radial direction.

The CMC component of any of the preceding clauses, wherein the end band is an outer band along a radial direction.

The CMC component of any of the preceding clauses, wherein the total axial interface surface area, $A_{AI}$, is a sum of a plurality of axial interfaces of the joint.

The CMC component of any of the preceding clauses, wherein the total radial interface surface area, $A_{RI}$, is a sum of a plurality of radial interfaces of the joint.

The CMC component of any of the preceding clauses, wherein the airfoil comprises a body and a base, wherein the base includes an extension having a first surface extending perpendicularly from the base, a second surface opposite the first surface also extending perpendicularly from the base, and a third surface, wherein the first surface and the second surface contribute to the total axial interface surface area, $A_{AI}$, and wherein the third surface contributes to the total radial interface surface area, $A_{RI}$.

The CMC component of any of the preceding clauses, wherein the extension defines a non-rectangular shape.

The CMC component of any of the preceding clauses, wherein the extension defines a dovetail shape or a dovetail-shaped slot.

The CMC component of any of the preceding clauses, wherein the airfoil defines a suction side, and wherein the extension is positioned on the suction side of the airfoil.

The CMC component of any of the preceding clauses, wherein the cold side surface area, $A_{CS}$, of the end band is a total footprint surface area of a cold side of the end band.

A gas turbine engine, the gas turbine engine comprising: a turbomachine comprising a stage of rotating rotor blades and a stage of airfoil segments adjacent the stage of the rotating rotor blades, the stage of airfoils comprising a first ceramic matrix composite (CMC) airfoil segment, the first CMC airfoil segment comprising: an end band having a radial surface defining a cold side surface area, $A_{CS}$; and an airfoil coupled to or formed with the end band, the airfoil and the end band defining a joint therebetween, the joint comprising one or more radial interfaces defining a total radial interface surface area, $A_{RI}$, and one or more axial interfaces defining a total axial interface surface area, $A_{AI}$, the first CMC airfoil segment defining a first ratio of the cold side surface area, $A_{CS}$, to the total axial interface surface area, $A_{AI}$, greater than or equal to 2.3 and less than or equal to 10 and a second ratio of the total axial interface surface area, $A_{AI}$ to the total radial interface surface area, $A_{RI}$, greater than or equal to 1.8 and less than or equal to 10.

The gas turbine engine of any of the preceding clauses, wherein the turbomachine comprises a high pressure turbine, and wherein the stage of rotating rotor blades is a first stage of rotor blades of the high pressure turbine.

The gas turbine engine of any of the preceding clauses, wherein the end band is an inner band along a radial direction.

The gas turbine engine of any of the preceding clauses, wherein the end band is an outer band along a radial direction.

The gas turbine engine of any of the preceding clauses, wherein the total axial interface surface area, $A_{AI}$, is a sum of a plurality of axial interfaces of the joint, and wherein the total radial interface surface area, $A_{RI}$, is a sum of a plurality of radial interfaces of the joint.

The gas turbine engine of any of the preceding clauses, wherein the airfoil comprises a body and a base, wherein the base includes an extension having a first surface extending perpendicularly from the base, a second surface opposite the first surface also extending perpendicularly from the base, and a third surface, wherein the first surface and the second surface contribute to the total axial interface surface area, $A_{AI}$, and wherein the third surface contributes to the total radial interface surface area, $A_{RI}$.

The gas turbine engine of any of the preceding clauses, wherein the extension defines a non-rectangular shape.

The gas turbine engine of any of the preceding clauses, wherein the extension defines a dovetail shape or a dovetail-shaped slot.

The gas turbine engine of any of the preceding clauses, wherein the airfoil defines a suction side, and wherein the extension is positioned on the suction side of the airfoil.

The gas turbine engine of any of the preceding clauses, wherein the cold side surface area, $A_{CS}$, of the end band is a total footprint surface area of a cold side of the end band.

A method for manufacturing a ceramic matrix composite (CMC) component includes laying first composite plies to form a first part, heating the first part to form an intermediate part, the intermediate part including a first portion bonded to a second portion, the first portion including an extension, laying second composite plies on the extension to form a second part, the second composite plies extending from the extension to the second portion, and heating the second part to form the CMC component.

The method of any of the previous clauses, wherein heating the first part includes at least one of a sintering process, an autoclaving process, or a burnout process.

The method of any of the previous clauses, wherein the extension includes a tab, and the second composite plies extend from the tab to the second portion.

The method of any of the previous clauses, wherein, upon heating the second part, the first portion, the second portion, and the second composite plies form a monolithic CMC component.

The method of any of the previous clauses, wherein the extension defines a first surface and a second surface, the second portion is bonded to the first surface, and the second composite plies extend from the second portion to the second surface.

The method of any of the previous clauses, wherein the second portion and the second composite plies encapsulate the extension.

The method of any of the previous clauses, further including heating some of the first composite plies to form the first portion, heating others of the first composite plies to form the second portion and, then, bonding the first portion to the second portion with a bonding agent.

The method of any of the previous clauses, wherein, upon heating the second part, the second composite plies and the intermediate part shrink to form a friction fit.

The method of any of the previous clauses, further including laying third composite plies on the CMC component to form an intermediate CMC component and heating the intermediate CMC component to form a second CMC component.

The method of any of the previous clauses, wherein the extension includes a dovetail-shaped slot.

The method of any of the previous clauses, wherein the second portion includes a dovetail shaped to mate with the dovetail-shaped slot.

The method of any of the previous clauses, wherein the CMC component is one of a nozzle or a rotor blade.

The method of any of the previous clauses, wherein the second composite plies form a green state part on the intermediate part.

A method for forming a ceramic matrix composite (CMC) component includes joining a heated first part to a heated second part to form an intermediate part, the heated first part and the heated second part each being formed of a CMC material, laying composite plies on the intermediate part across the heated first part and the heated second part to form a third part, and heating the third part to form the CMC component in one of an autoclaving process, a burnout process, or a sintering process.

The method of any of the previous clauses, wherein the heated first part and the heated second part define an axial interface and the composite plies extend along the axial interface between the heated first part and the heated second part.

The method of any of the previous clauses, wherein, upon heating the third part, the intermediate part and the composite plies form a monolithic CMC component.

The method of any of the previous clauses, wherein the heated first part includes a tab defining a first surface and a second surface, the heated second part is joined to the first surface, and the composite plies extend from the heated second part to the second surface of the tab.

The method of any of the previous clauses, wherein the heated first part is bonded to the heated second part with a bonding agent.

The method of any of the previous clauses, further including laying second composite plies on the CMC component to form an intermediate CMC component and heating the intermediate CMC component to form a second CMC component.

The method of any of the previous clauses, wherein the composite plies form a green state part on the intermediate part.

A CMC component formed by the method of any of the previous clauses.

A system for performing the method any of the previous clauses.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine, the gas turbine engine comprising:
    a turbomachine comprising a stage of rotating rotor blades and a stage of airfoil segments adjacent the stage of the rotating rotor blades, the stage of airfoil segments comprising a first ceramic matrix composite (CMC) airfoil segment, the first CMC airfoil segment comprising:
        an end band having a radial surface defining a cold side surface area, $A_{CS}$; and
        an airfoil coupled to or formed with the end band, the airfoil and the end band defining a joint therebetween, the joint comprising one or more radial interfaces defining a total radial interface surface area, $A_{RI}$, and one or more axial interfaces defining a total axial interface surface area, $A_{AI}$, the first CMC airfoil segment defining a first ratio of the cold side surface area, $A_{CS}$, to the total axial interface surface area, $A_{AI}$, greater than or equal to 2.3 and less than or equal to 10 and a second ratio of the total axial interface surface area, $A_{AI}$ to the total radial interface surface area, $A_{RI}$, greater than or equal to 1.8 and less than or equal to 10.

2. The gas turbine engine of claim 1, wherein the turbomachine comprises a high pressure turbine, and wherein the stage of rotating rotor blades is a first stage of rotor blades of the high pressure turbine.

3. The gas turbine engine of claim 1, wherein the end band is an inner band along a radial direction.

4. The gas turbine engine of claim 1, wherein the end band is an outer band along a radial direction.

5. The gas turbine engine of claim 1, wherein the total axial interface surface area, $A_{AI}$, is a sum of a plurality of axial interfaces of the joint, and wherein the total radial interface surface area, $A_{RI}$, is a sum of a plurality of radial interfaces of the joint.

6. The gas turbine engine of claim 1, wherein the airfoil comprises a body and a base, wherein the base includes an extension having a first surface extending perpendicularly from the base, a second surface opposite the first surface also extending perpendicularly from the base, and a third surface, wherein the first surface and the second surface contribute to the total axial interface surface area, $A_{AI}$, and wherein the third surface contributes to the total radial interface surface area, $A_{RI}$.

7. The gas turbine engine of claim 6, wherein the extension defines a non-rectangular shape.

8. The gas turbine engine of claim 6, wherein the extension defines a dovetail shape or a dovetail-shaped slot.

9. The gas turbine engine of claim 6, wherein the airfoil defines a suction side, and wherein the extension is positioned on the suction side of the airfoil.

10. The gas turbine engine of claim 1, wherein the cold side surface area, $A_{CS}$, of the end band is a total footprint surface area of a cold side of the end band.

11. A ceramic matrix composite (CMC) component comprising:
   an end band having a radial surface defining a cold side surface area, $A_{CS}$; and
   an airfoil coupled to or formed with the end band, the airfoil and the end band defining a joint therebetween, the joint comprising one or more radial interfaces defining a total radial interface surface area, $A_{RI}$, and one or more axial interfaces defining a total axial interface surface area, $A_{AI}$, the CMC component defining a first ratio of the cold side surface area, $A_{CS}$, to the total axial interface surface area, $A_{AI}$, greater than or equal to 2.3 and less than or equal to 10 and a second ratio of the total axial interface surface area, $A_{AI}$ to the total radial interface surface area, $A_{RI}$, greater than or equal to 1.8 and less than or equal to 10.

12. The CMC component of claim 11, wherein the end band is an inner band along a radial direction.

13. The CMC component of claim 11, wherein the end band is an outer band along a radial direction.

14. The CMC component of claim 11, wherein the total axial interface surface area, $A_{AI}$, is a sum of a plurality of axial interfaces of the joint.

15. The CMC component of claim 11, wherein the total radial interface surface area, $A_{RI}$, is a sum of a plurality of radial interfaces of the joint.

16. The CMC component of claim 11, wherein the airfoil comprises a body and a base, wherein the base includes an extension having a first surface extending perpendicularly from the base, a second surface opposite the first surface also extending perpendicularly from the base, and a third surface, wherein the first surface and the second surface contribute to the total axial interface surface area, $A_{AI}$, and wherein the third surface contributes to the total radial interface surface area, $A_{RI}$.

17. The CMC component of claim 16, wherein the extension defines a non-rectangular shape.

18. The CMC component of claim 16, wherein the extension defines a dovetail shape or a dovetail-shaped slot.

19. The CMC component of claim 16, wherein the airfoil defines a suction side, and wherein the extension is positioned on the suction side of the airfoil.

20. The CMC component of claim 11, wherein the cold side surface area, $A_{CS}$, of the end band is a total footprint surface area of a cold side of the end band.

* * * * *